United States Patent
Ko

(10) Patent No.: US 10,511,037 B2
(45) Date of Patent: Dec. 17, 2019

(54) APPARATUS FOR REMOVING MOISTURE OF STACK ENCLOSURE

(71) Applicant: HYUNDAI MOTOR COMPANY, Seoul (KR)

(72) Inventor: Haeng Jin Ko, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 272 days.

(21) Appl. No.: 15/332,796

(22) Filed: Oct. 24, 2016

(65) Prior Publication Data

US 2017/0331124 A1 Nov. 16, 2017

(30) Foreign Application Priority Data

May 13, 2016 (KR) .................. 10-2016-0058539

(51) Int. Cl.
*H01M 8/04119* (2016.01)
*H01M 8/04701* (2016.01)
*H01M 8/2475* (2016.01)
*H01M 8/04007* (2016.01)

(52) U.S. Cl.
CPC ... *H01M 8/04164* (2013.01); *H01M 8/04007* (2013.01); *H01M 8/04731* (2013.01); *H01M 8/2475* (2013.01); *H01M 2250/20* (2013.01); *Y02T 90/32* (2013.01)

(58) Field of Classification Search
CPC .................. H01M 8/04164; H01M 8/04731
See application file for complete search history.

(56) References Cited

U.S. PATENT DOCUMENTS

| 2007/0154757 A1 | 7/2007 | Okazaki |
| 2009/0035616 A1* | 2/2009 | Darling ............... H01M 8/0258 429/429 |

FOREIGN PATENT DOCUMENTS

| JP | 2006-140050 | * | 6/2006 | ............. H01M 8/04 |
| JP | 2006-140050 A | | 6/2006 | |
| KR | 2011-0006055 A | | 1/2011 | |
| KR | 10-2012-0046658 A | | 5/2012 | |
| KR | 10-2012-0116747 A | | 10/2012 | |
| KR | 10-1189566 B1 | | 10/2012 | |
| KR | 10-2013-0083203 A | | 7/2013 | |
| KR | 10-1526421 B1 | | 6/2015 | |

* cited by examiner

*Primary Examiner* — Osei K Amponsah
(74) *Attorney, Agent, or Firm* — Morgan, Lewis & Bockius LLP

(57) ABSTRACT

An apparatus for removing moisture of a stack enclosure includes a protective case accommodating a fuel cell stack therein, a radiation heater mounted at a lower surface of the protective case, the radiation heater enabling discharged air to move toward an upper part of the protective case, and a cooler for cooling air moving along the upper part of the protective case, the cooler guiding cooled air to move toward the lower surface of the protective case.

10 Claims, 3 Drawing Sheets

APPARATUS FOR REMOVING MOISTURE OF STACK ENCLOSURE

CROSS-REFERENCE TO RELATED APPLICATION

This application claims the benefit of priority to Korean Patent Application No. 10-2016-0058539, filed on May 13, 2016 with the Korean Intellectual Property Office, the disclosure of which is incorporated herein by reference.

TECHNICAL FIELD

The present disclosure relates to an apparatus for removing moisture from a stack enclosure, and more particularly, to an apparatus for removing moisture from a stack enclosure capable of removing moisture condensed in the stack enclosure using low power.

BACKGROUND

Generally, moisture condensed in a stack enclosure (protective case) causes a decrease of insulation, corrosion of a metal part, and damage to plastic components in a stack of about 400V and a fuel cell system which are disposed in the stack enclosure.

To remove moisture, a ventilation system, in which outer air is injected through a blower or inner air is exhausted using a predetermined negative pressure using a flow of outer air, or a separate dehumidifier (or dehumidifying unit) may be provided.

Furthermore, moisture condensed in the stack enclosure may be removed using a cooling pipe formed at a sidewall or bottom surface of the stack enclosure, in conjunction with a coolant driving device such as a pump.

Since such a system may need to drive a blower for ventilating humid air in the stack enclosure and may use an air circulating and cooling system in which humid air is dehydrated through a separate dehumidifier and heat exchanger and the dehydrated air is injected again, or may be mounted with a pump and a radiation module for circulating coolant to a coolant path formed in the enclosure, the system for dehumidification may consume significant power. As such, dehumidification efficiency may be low.

Accordingly, during operation of the fuel cell or when the fuel cell system is turned off, battery power is continuously consumed, such that there are disadvantages in a decrease of efficiency of the fuel cell system and instability of the fuel cell system at restarting.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in view of the above problems, and it is an object of the present disclosure to provide an apparatus for removing moisture from a stack enclosure, in which a radiation heater and a cooler are mounted in the stack enclosure so as to generate air flow surrounding a fuel cell stack and moisture condensed from air passing through the cooler is collected along a cover trap to be discharged outside, and, as such, moisture condensed in the stack enclosure may be efficiently removed.

In accordance with one aspect of the present disclosure, the above and other objects can be accomplished by the provision of an apparatus for removing moisture of a stack enclosure including a protective case accommodating a fuel cell stack therein, a radiation heater mounted at a lower surface of the protective case, the radiation heater enabling discharged air to move toward an upper part of the protective case, and a cooler for cooling air moving along the upper part of the protective case, the cooler guiding cooled air to move toward the lower surface of the protective case.

In an embodiment, the radiation heater may be mounted at one corner of the lower surface of the protective case, and the cooler may be mounted at one corner of an upper surface of the protective case while being disposed opposite to the radiation heater.

In another embodiment, the protective case may include the lower surface disposed at a lower part and an upper surface including a pair of sidewalls and a top surface, both ends of the top surface may be connected to upper parts of the sidewalls, respectively, and one sidewall which is connected to the cooler, of the sidewalls may have an opening area.

In still another embodiment, the protective case may include a cover trap covering the opening area, the cover trap may have an inclined surface, and moisture condensed from air passing through the cooler may move along the inclined surface to be collected in the cover trap.

In yet another embodiment, the cover trap may be connected to a drain hose to discharge collected moisture to the outside of the protective case.

In yet another embodiment, the cooler may include a cooling plate having an insulating surface and a heating plate opposite to the cooling plate while a semiconductor may be interposed between the cooling and heating plates, and the cooling plate may be formed to have an "S" shape and may be mounted at one corner of the upper surface of the protective case and, as such, an end thereof may be connected to the opening area.

In yet another embodiment, the cooler may include a thermoelectric module.

In yet another embodiment, the radiation heater may be obliquely mounted at one corner of the lower surface of the protective case so that air flows toward a sidewall of the protective case.

In yet another embodiment, the protective case may include a stack mount spaced apart from a lower surface of the fuel cell stack to form a convection path of air in the protective case.

It is understood that the terms "vehicle", "vehicular" and other similar terms as used herein are inclusive of motor vehicles in general such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given below by way of illustration only, and thus are not limitative of the present disclosure, and wherein.

Figure 1:
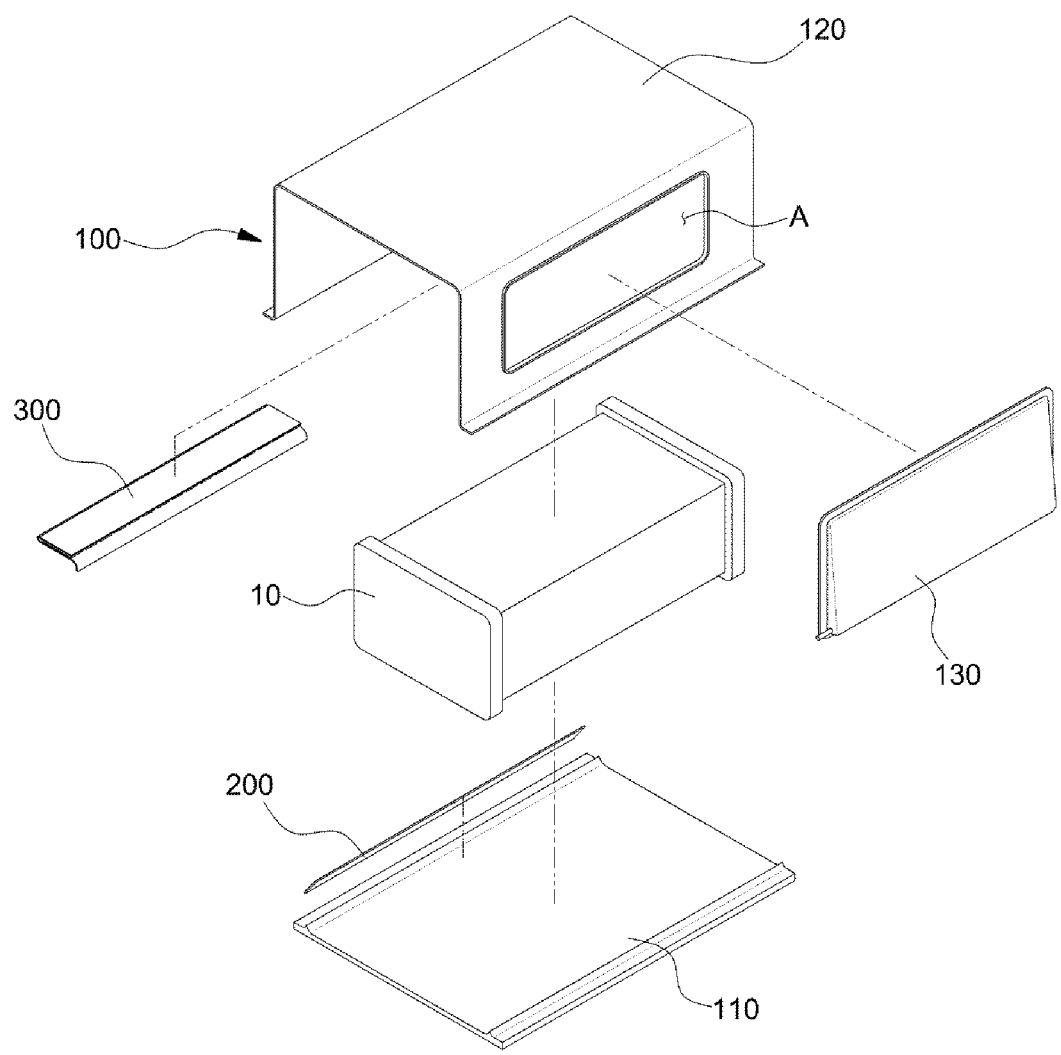
FIG. 1 is an exploded perspective view illustrating a structure of an apparatus for removing moisture from a stack enclosure according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, an example embodiment of the present disclosure will be described in detail with reference to accompanying drawings.

The advantages, features, and schemes for achieving the advantages and features of the present disclosure will be comprehended by those skilled in the art based on the embodiments, which are described later in detail, together with the accompanying drawings.

The present disclosure is not limited to the following embodiments and includes various applications and modifications. The description of the embodiments will allow those skilled in the art to completely comprehend the scope of the present disclosure. The present disclosure is only defined by the scope of the accompanying claims.

In addition, details of generally known technology that may make the subject matter of the present disclosure unclear will be omitted in the following description.

Figure 2:
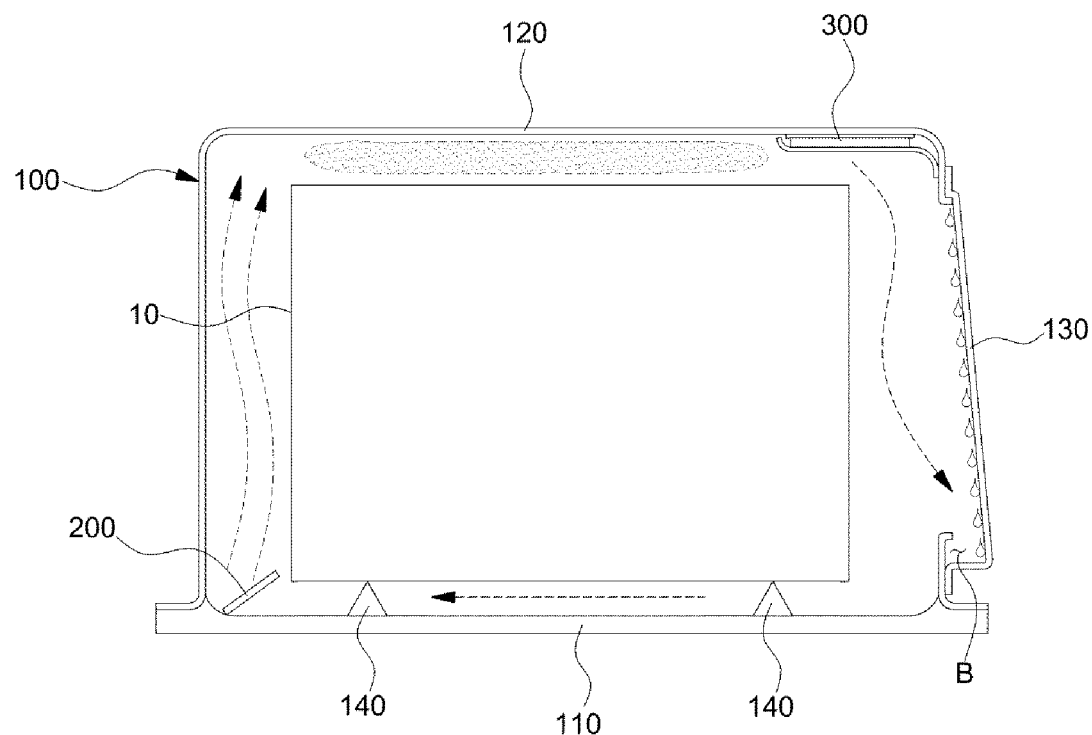
FIG. 2 is a view schematically illustrating a structure of an apparatus for removing moisture from the stack enclosure according to an illustrated embodiment of the present disclosure.
Figure 3:
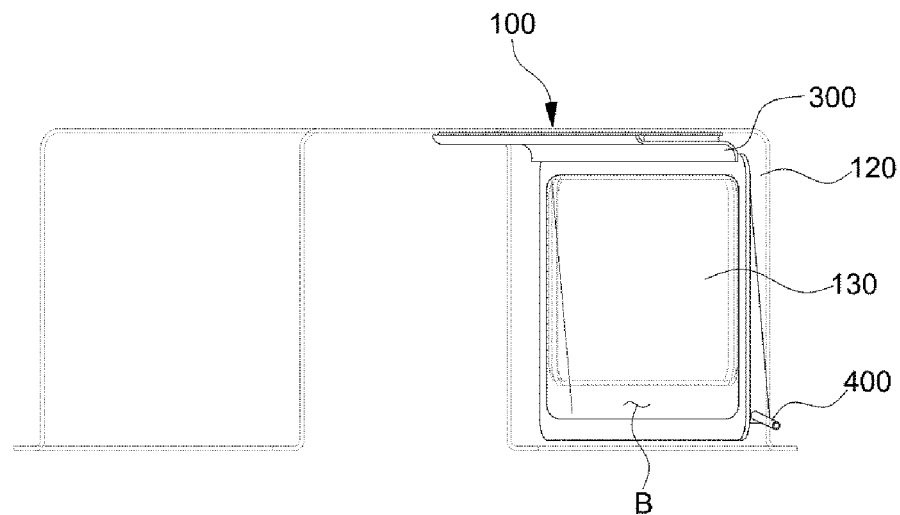
FIG. 3 is a view illustrating an installed state of a cover trap of an apparatus for removing moisture from a stack enclosure according to an illustrated embodiment of the present disclosure.

FIG. 1 is an exploded perspective view illustrating a structure of an apparatus for removing moisture from a stack enclosure according to an embodiment of the present disclosure. FIG. 2 is a view schematically illustrating a structure of an apparatus for removing moisture from a stack enclosure according to an illustrated embodiment of the present disclosure. FIG. 3 is a view illustrating an installed state of a cover trap of an apparatus for removing moisture from a stack enclosure according to an illustrated embodiment of the present disclosure.

As illustrated in FIG. 1, the apparatus for removing moisture from the stack enclosure according to the illustrated embodiment of the present disclosure may include a protective case 100, a radiation heater 200 and a cooler 300.

The protective case 100 includes a lower surface 110 disposed at a lower part of the protective case 100 and an upper surface 120 including a pair of sidewalls and a top surface. In this case, both ends of the top surface are connected to upper parts of the sidewalls. A fuel cell stack 10 is accommodated in the protective case 100.

Namely, the protective case 100 may have a predetermined volume for sealing the fuel cell stack 10. The protective case 100 is formed of a metal material. To be selected as the protective case 100, the protective case 100 may have characteristics such as superior handling for being stably mounted at a loading space of the vehicle, high insulation, high chemical resistance and high corrosion resistance as well as protection of the entire fuel cell stack by surrounding the entire fuel cell stack.

Meanwhile, during an operation of the fuel cell stack 10 for generating power, internal air in the protective case 100 becomes hot and humid. When the operation of the fuel cell stack 10 is not operated, a temperature of internal air falls to form condensed water. The above-explained phenomenon is continuously repeated during operation of the fuel cell stack 10.

Since condensed water generated in the protective case 100 may cause a decrease of insulation, electrical shorts, corrosion of components and a deterioration in the fuel cell system, condensed water may be removed not only during the operation of the fuel cell stack 10, but also when the fuel cell stack 10 is not operated.

To this end, as illustrated in FIG. 2, the radiation heater 200 may be mounted at one corner of the lower surface 110 of the protective case 100 and, as such, hot and humid air may move to an upper part of the protective case 100.

Air transferred by the radiation heater 200 moves along a space between the upper surface 120, namely, the upper surface of the protective case 100, and the fuel cell stack 10. Air is condensed by passing through the cooler 300, and moisture generated thereby is collected.

Namely, the cooler 300 may include a thermoelectric module. The cooler 300 is mounted at one corner of the upper surface 120 of the protective case 100 while being disposed opposite to the radiation heater 200. The cooler 300 cools air moving along the upper part of the protective case 100.

In this case, cooled air is condensed to form moisture. Moisture is discharged through the cover trap 130 outside. Air having low humidity moves along an insulating surface of the cooler 300, and then is circulated to the lower surface 110 of the protective case 100.

Namely, hot and humid air passes through the cooler 300 while being in contact with the cooler 300 to be cooled and dehumidified. As such, the humidity level of the air decreases. In this case, a temperature of the cover trap 130 disposed at a front of the vehicle and surroundings thereof are lowered to near room temperature due to driving wind of the vehicle or operation wind of a fan of a thermal radiation module (not shown). This generates air convection in the protective case 100. Moisture condensed from air passing through the cooler 300 moves along an inclined surface of the cover trap 130 to be collected.

Thus, according to the illustrated embodiment, when the fuel cell stack 10 is operated to generate power, air becomes hot and humid and convection of air is generated using the radiation heater 200 and the cooler 300. As such, condensation in the protective case 100 may be prevented. As a result, a decrease of insulation, electrical shorts, a corrosion of components and a deterioration of the fuel cell system which are generated by moisture condensation may be prevented.

Furthermore, even when the fuel cell stack 10 stops operating as the vehicle stops, hot and humid air may move by the radiation heater 200. In addition, moisture condensed from air passing through the cooler 300 by convection is collected and then removed. As a result, moisture in the protective case 100 may be removed using low power.

According to an illustrated embodiment, as illustrated in FIG. 2, the protective case 100 may further include a stack mount 140 such that the fuel cell stack 10 is spaced apart at a predetermined height from the lower surface 110 to form a convection path of air in the protective case 100.

A plurality of stack mounts 140 is provided and the stack mounts 140 may have identical heights. The stack mounts 140 may be mounted at corners of a lower surface of the fuel cell stack 10 and, as such, the convection path may be formed between the lower surface of the fuel cell stack 10 and the lower surface 110 of the protective case 100.

Meanwhile, as illustrated in FIG. 3, the cover trap 130 of the protective case 100 may cover an opening area A of one sidewall included in the upper surface 120. The cover trap 130 may be mounted to have an inclined surface. Moisture condensed from air passing through the cooler 300 moves along the inclined surface to be collected in the cover trap 130.

The cover trap 130 may be coupled to the sidewall included in the upper surface 120 of the protective case 100 to form an inner space B between the cover trap 130 and the sidewall. The condensed moisture moves along the inclined surface to be collected in the inner space B.

The cover trap 130 may be connected to a drain hose 400 and discharges moisture collected in the inner space B after moisture moves along the inclined surface to the outside of the protective case 100.

In this case, a bottom surface of the inner space B of the cover trap 130 for collecting moisture may be inclined toward a part connected to the drain hose 400. Accordingly, collected moisture may be easily discharged through the drain hose 400.

Figure 4:
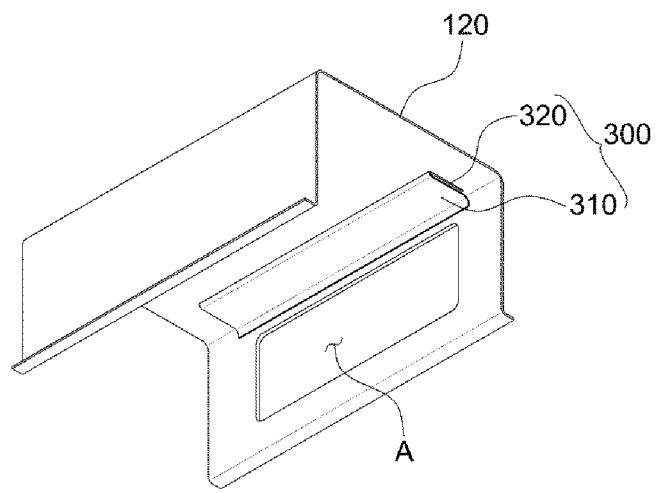
FIG. 4 is a view illustrating an installed state of a cooler of an apparatus for removing moisture from the stack enclosure according to an illustrated embodiment of the present disclosure.
Figure 5:
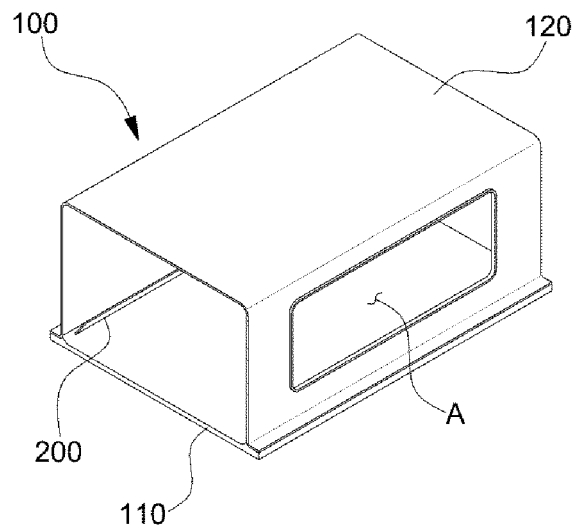
FIG. 5 is a view illustrating an install state of a radiation heater of an apparatus for removing moisture from the stack enclosure according to the illustrated embodiment of the present disclosure.

FIG. 4 is a view illustrating an installed state of a cooler of an apparatus for removing moisture from a stack enclosure according to an illustrated embodiment of the present disclosure. FIG. 5 is a view illustrating an installed state of a radiation heater of an apparatus for removing moisture from a stack enclosure according to an illustrated embodiment of the present disclosure.

As illustrated in FIG. 4, the cooler 300 according to an illustrated embodiment may include a cooling plate 310 having the insulating surface and a heating plate (not shown) opposite to the cooling plate 310 while a semiconductor 320 is interposed between the heating plate and the cooling plate 310.

Namely, the cooler 300 may include a thermoelectric module, in which a P type thermoelectric material and an N type thermoelectric material are bonded by being disposed between metal electrodes to form a PN junction pair.

That is, when the cooler 300 generates temperature difference between the PN junction pair, the cooler 300 may function as a generator which generates power by the Seebeck effect. Furthermore, the cooler 300 may be used as a temperature controller by the Peltier effect, in which one PN junction is cooled and the other PN junction is heated. In this case, since the cooler 300 includes the cooling plate 310 disposed at one side of the semiconductor 320 and the heating plate disposed at the other side of the semiconductor 320, when current is applied, an exothermic reaction is performed at the heating plate, whereas cooling is performed by an endothermic reaction at the cooling plate 310.

In this case, the cooling plate 310 may be formed to have an "S" shape and, as such, the cooling plate 310 cools air moving to the upper part of the protective case 100 and guides movement of air to the lower surface 110 of the protective case 100.

The cooling plate 310 may be mounted at one corner of the upper surface 120 of the protective case 100. One end of the cooling plate 310 may be connected to the opening area A.

Namely, the cooling plate 310 may be connected to the opening area A which is formed at one sidewall adjacent to the front of the vehicle of a pair of sidewalls included in the upper surface 120 of the protective case 100. As such, moisture cooled by driving wind of the vehicle and the cooling plate 310 moves along the inclined surface of the cover trap 130 to be collected in the inner space B.

Meanwhile, as illustrated in FIG. 5, the radiation heater 200 may be obliquely mounted at one corner of the lower surface 110 of the protective case 100 so that air flows toward a sidewall of the protective case 100.

This serves to prevent condensation at one sidewall of a rear of the vehicle while the sidewall is included in the upper surface 120 of the protective case 100. Since a temperature of the sidewall of the rear of the vehicle is relatively lower than that of the fuel cell stack 10, condensation may occur at the sidewall of the rear of the vehicle due to the temperature difference.

To this end, according to an illustrated embodiment, the radiation heater 200 may be obliquely mounted toward the sidewall of the rear of the vehicle and, as such, hot and humid air moves along the sidewall to the upper part of the protective case 100. As a result, condensation at the sidewall of the protective case 100, which is disposed toward the rear of the vehicle, may be effectively prevented.

As apparent from the above description, in accordance with the present disclosure, an apparatus for removing moisture from the stack enclosure is provided. The radiation heater and cooler may be mounted in the stack enclosure so as to generate air flow surrounding the fuel cell stack and moisture condensed from air passing through the cooler may be collected along the cover trap to be discharged outside. As such, moisture condensed in the stack enclosure may be efficiently removed.

Accordingly, there is an advantage in that a decrease of insulation, electrical shorts, a corrosion of components and a deterioration which may be generated in the stack enclosure by moisture condensation may be prevented.

Furthermore, a separate dehumidifier and heat exchanger for dehumidifying humid air, and an air circulator for reinjecting dry air to the stack enclosure are not necessary so that condensed moisture may be removed using low power.

Although embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An apparatus for removing moisture of a stack enclosure comprising:
   a protective case accommodating a fuel cell stack therein, the protective case including:
      a lower part at a bottom side of the protective case; and an upper part at a top side of the protective case and including a pair of sidewalls and a top surface, wherein the upper part is spaced apart at a predetermined distance from the fuel cell stack such that air flows through a space between the upper part and the fuel cell stack as a convection path inside the protective case;

a radiation heater disposed in the convection path at, the lower part of the protective case, such that the radiation heater enables air heated and discharged from the radiation heater to move thermodynamically toward the top surface of the upper part of the protective case along the convection path; and a cooler disposed in the convection path at the top surface of the upper part of the protective case to cool the air moving along the convection path from the radiation heater, wherein such that the cooler guides the cooled air to move toward the lower part of the protective case such that moisture condensed from the air heated by the radiation heater and then cooled and condensed by the cooler is collected to be discharged outside the protective case.

2. The apparatus for removing moisture according to claim 1, wherein the radiation heater is mounted at one corner of the lower part of the protective case, and the cooler is mounted at one corner of the top surface of the protective case being disposed opposite from the radiation heater.

3. The apparatus for removing moisture according to claim 1, wherein ends of the top surface are connected to upper parts of the sidewalls, respectively, and one sidewall connected to the cooler, of the pair of sidewalls, has an opening area.

4. The apparatus for removing moisture according to claim 3, wherein the protective case comprises a cover trap covering the opening area, the cover trap including an inclined surface, and moisture condensed from air passing through the cooler moves along the inclined surface to be collected in the cover trap.

5. The apparatus for removing moisture according to claim 4, wherein the cover trap is connected to a drain hose for discharging collected moisture to an outside of the protective case.

6. The apparatus for removing moisture according to claim 3, wherein the cooler comprises:

a cooling plate having an insulating surface; and a heating plate opposite to the cooling plate, wherein a semiconductor is interposed between the cooling and heating plates, and the cooling plate has an "S" shape and is mounted at one corner of the upper part of the protective case, and an end of the cooling plate is connected to the opening area.

7. The apparatus for removing moisture according to claim 1, wherein the cooler includes a thermoelectric module.

8. The apparatus for removing moisture according to claim 1, wherein the radiation heater is obliquely mounted at one corner of the lower part of the protective case so that air flows toward a sidewall of the pair of sidewalls of the upper part of the protective case.

9. The apparatus for removing moisture according to claim 1, wherein the protective case comprises a stack mount spaced apart from a lower surface of the fuel cell stack.

10. The apparatus for removing moisture according to claim 1, wherein the radiation heater is disposed at a lower corner of the protective case while the cooler is disposed at an upper corner of the protective case to be diagonally located with respect to each other.

* * * * *